United States Patent [19]

Laramee

[11] Patent Number: 4,527,533
[45] Date of Patent: Jul. 9, 1985

[54] GASOLINE PREHEATER

[76] Inventor: Joseph M. Laramee, 508 Birch St., Okanagen Falls, British Columbia, Canada

[21] Appl. No.: 558,413

[22] Filed: Dec. 2, 1983

[51] Int. Cl.³ .......................................... F02M 31/00
[52] U.S. Cl. ..................... 123/557; 123/552
[58] Field of Search ................ 123/557, 552; 165/52, 165/51; 261/144, 145

[56] References Cited

U.S. PATENT DOCUMENTS

| | | | |
|---|---|---|---|
| 4,044,742 | 8/1977 | Linder | 123/557 |
| 4,072,138 | 2/1978 | Hawkins | 123/557 |
| 4,146,002 | 3/1979 | Quinn | 123/557 |
| 4,303,051 | 12/1981 | Weishaar | 123/557 |
| 4,367,717 | 1/1983 | Ray | 123/557 |
| 4,393,851 | 7/1983 | Gorans | 123/557 |
| 4,401,091 | 8/1983 | Costello | 123/557 |
| 4,403,590 | 9/1983 | Davis | 123/557 |

*Primary Examiner*—Ronald H. Lazarus
*Attorney, Agent, or Firm*—Townsend and Townsend

[57] ABSTRACT

A gasoline preheater has a hot fluid chamber, preferably a hot water chamber, with an inlet and outlet. A gasoline chamber is disposed in heat exchanging contact with the hot fluid chamber, and also has an inlet and outlet. A thermostat has a heat sensing element in communication with the gasoline chamber. The thermostat also has a valve element communicating with the hot fluid chamber. The foregoing arrangement is so as to allow an increased hot fluid, usually hot water from a hot water cooling system of a typical gasoline engine, to flow through the hot fluid chamber in response to a decrease in temperature of gasoline in the gasoline chamber. The gasoline preheater is used in combination with a gasoline engine having a hot fluid system, typically a hot water cooling system, a carburetor, and a source of pressurized fuel, typically a fuel pump.

24 Claims, 3 Drawing Figures

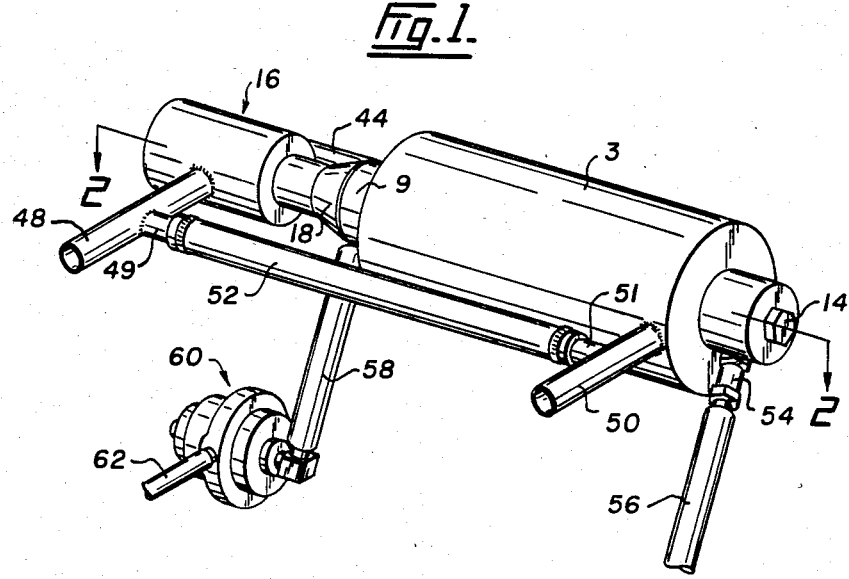
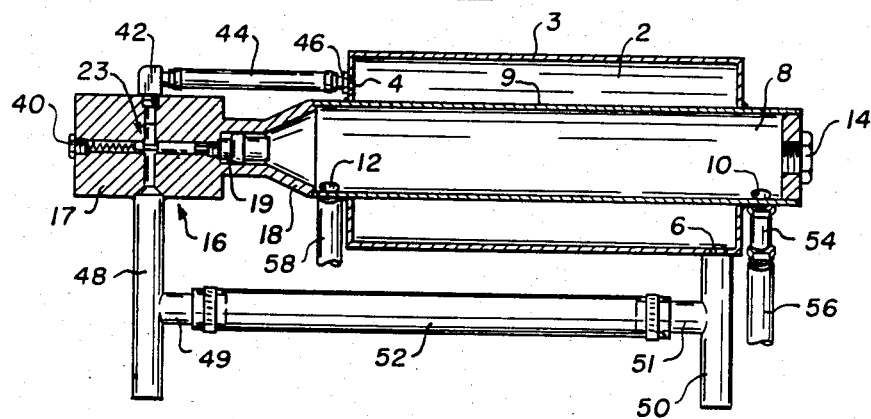
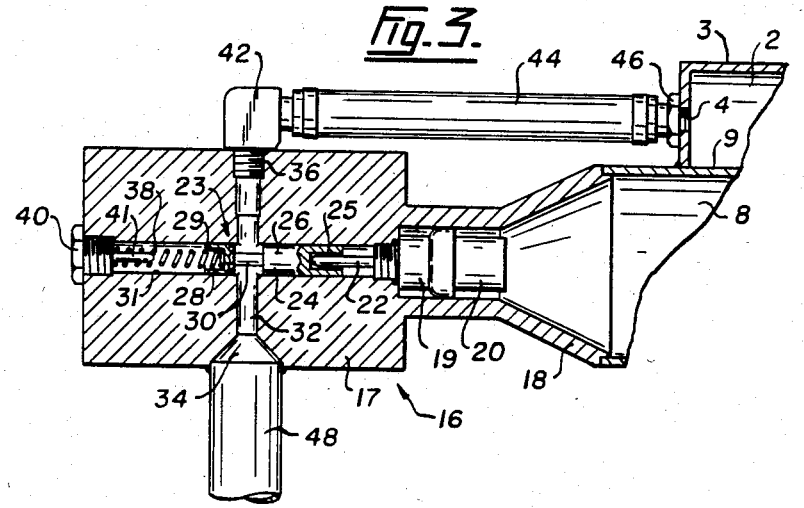

GASOLINE PREHEATER

FIELD OF THE INVENTION

This invention relates to a gasoline preheater, for use on a gasoline engine having a hot fluid system, preferably a hot water cooling system, and a carburetor, and a source of pressurized fuel such as typically delivered from a fuel pump on the engine.

DESCRIPTION OF PRIOR ART

It has been known in the past that providing a means to preheat gasoline prior to entering the carburetor of a gasoline engine, can provide increased efficiency and therefore better mileage in a vehicle utilizing such an engine equipped with such a gasoline heater. For example, Canadian Pat. No. 973,439 to Richard describes a device which includes an inner fuel chamber and outer water heating jacket, as well as a water by-pass line. In the device of this patent, a thermostatic valve is provided which responds to the temperature of the hot water from the vehicle engine, and blocks off water flow when such temperature is too high or too low. Thus, gasoline is heated in the inner chamber, the heating being controlled by control of the hot water in the outer chamber. Such a device lacks direct control over the temperature to which the gasoline is heated. Such temperature will depend not only on the temperature of the water, but also upon rate of gasoline flow to the inner chamber as well as the gasoline initial temperature. Because of the foregoing indirect control on gasoline temperature only, the gasoline temperature can vary over a range depending upon the foregoing factors. In addition, no means is provided in the device of that patent to prevent heated gasoline from expanding or flowing back down the gasoline line entering the inner gasoline chamber. Such expansion through that line can occur at any particular time when gasoline is not leaving the gasoline chamber in the device to enter the carburetor, due to the carburetor float position. The foregoing situation can result in loss of heat through the inlet line to the gasoline chamber of the preheating device of that patent. In addition to the foregoing disadvantage, no means are provided for controlling the pressure of heated gasoline leaving the gasoline heating chamber of the device, and such heated gasoline would be delivered to the carburetor at the pressure of the outlet of the engine fuel pump. Such a pressure is unnecessarily high as heated gasoline is less viscous and flows more readily than unheated gasoline. Thus, if the heated gasoline is delivered at the same pressure as unheated gasoline would be without the device, the rate of flow of heated gasoline into the carburetor will be unnecessarily high thereby possibly resulting in overflow in the carburetor float chamber as well as unnecessary wear on the carburetor float valve.

Canadian Pat. No. 1,015,234 by Lebowitz et al and corresponding to U.S. patent application Ser. No. 449,004, also shows a preheating device. However, the device of that patent does not have any type of thermostatic control, nor any means of preventing gasoline expansion or flow back down the inlet line to the gasoline heating chamber, nor of regulating the pressure of gasoline leaving such chamber. As a result, the device of that patent suffers from the disadvantages described, of the device of the Richard patent. Other gasoline preheating devices are also disclosed in Canadian Pat. No. 1,114,695 to Shearer and Canadian Pat. No. 1,101,284 to Gendron. The devices of the foregoing two patents though, also suffer from the same disadvantages as already discussed in connection with the Richard and Lebowitz et al patents.

SUMMARY OF THE INVENTION

A gasoline preheater is provided which comprises a hot fluid chamber having an inlet and an outlet, and a gasoline chamber in heat exchanging contact with the hot fluid chamber, the gasoline chamber also having an inlet and outlet, and an access port therein. Preferably, the valve element of the thermostat is in communication with the inlet of the hot fluid chamber so as to control hot fluid flow into the hot fluid chamber.

The device also has a thermostat with a housing which has a valve member bore extending therethrough, and a hot fluid passage extending therethrough which intersects the valve member bore and communicates with the hot fluid chamber. A valve member is slidably disposed within the valve member bore to move between a fully closed position blocking the hot fluid passage, and a fully opened position not substantially blocking the hot fluid passage. A heat sensing mechanism is releasably mounted on the housing, such as by being screwed thereinto, so as to be removable from it through the access port in the gasoline chamber. The heat sensing mechanism communicates with the gasoline chamber and the valve member so as to reversibly move the valve member toward the fully closed position and allow a decreased hot fluid flow through the hot fluid bore and into the hot fluid chamber, in response to an increase in gasoline temperature in the gasoline chamber.

Preferably, the valve element of the thermostat is in communication with the inlet of the hot fluid chamber so as to control hot fluid into the hot fluid chamber. The hot fluid chamber may usefully be in the from of a jacket disposed around the sides of the gasoline chamber. In addition, the access port in the gasoline chamber, and the heat sensing element are preferably aligned and disposed at opposite ends of the gasoline chamber. In addition, the thermostat housing may usefully be provided with an access port adjacent an end of the valve member bore remote from the gasoline chamber, such that the valve member can be removed from the valve member bore through such access port. Preferably, the heat sensing element comprises an expansion portion inserted in a receptacle in the valve member, and the thermostat additionally comprises in such case resilient means for urging the valve member toward the fully opened position. A pressure regulator is also usefully additionally provided which communicates with the outlet of the gasoline chamber.

The hot fluid chamber is preferably in the form of a jacket disposed around the sides of the gasoline chamber. This hot fluid chamber is further preferably a hot water chamber, in which case the gasoline preheater additionally comprises a water by-pass pipe. The water by-pass pipe communicates between the inlet and outlet of the hot water chamber, so as to enable water to pass therebetween when the valve element of the thermostat is closed.

The pressure regulator is usefully set at about 1 to 5 p.s.i., while the thermostat is constructed to maintain gasoline temperature in the gasoline chamber at about 110° to 120° F.

The foregoing gasoline preheater is used in combination with a gasoline engine which has a hot fluid system, preferably in the form of a hot water cooling system, a carburetor, and a source of pressurized fuel which is typically delivered from a fuel pump. In such cases, the hot chamber of the gasoline preheater has its inlet and outlet appropriately communicating with the hot water cooling system of the engine so as to allow hot water to pass from the hot water cooling system, through the hot water chamber, and back to the hot water cooling system.

DRAWINGS

Embodiments of the invention will now be described with reference to the drawings in which:

FIG. 1 is a perspective view of a gasoline preheater of the present invention;

FIG. 2 is a horizontal cross-section along the line 2—2 of FIG. 1; and

FIG. 3 is an enlarged view from a portion of the cross-section in FIG. 2.

DETAILED DESCRIPTION OF EMBODIMENTS OF THE INVENTION

Referring to the drawings, the gasoline preheater shown consists of an annular hot water chamber 2 defined by cylindrical housing 3. Hot water chamber 2 has an inlet 4 and outlet 6. Concentrically disposed within hot water chamber 2, is a gasoline chamber 8 defined by generally cylindrical housing 9. The gasoline chamber 8 is also provided with an inlet 10 and outlet 12. A threaded plug 14 is disposed in a threaded hole in one end of housing 9 for a purpose which will later be described.

A thermostat generally designated 16 has a housing 17 which includes an open ended frusto-conical portion 18 connected to one end of housing 9 such that a heat sensing element generally designated 19, is in communication with gasoline chamber 8. Heat sensing element 19 includes sensing portion 20 and expansion portion 22 which will slide outwardly from sensing portion 20 (i.e. to the left in FIG. 3) in response to an increased temperature at sensing portion 20. Thermostat 16 also includes a valve element 23 which has a valve member 24 with two cylindrical portions 26 and 28 interconnected by a thinner cylindrical portion 30. Cylindrical portions 26 and 28 are slidable within a cylindrical valve member bore 31 in housing 17. At normal ambient temperatures of about 70° F. or less, valve member 24 is held in an open position as shown in FIG. 3 between expansion portion 22 of heat sensing element 19 which is inserted in a cylindrical receptacle 25 in valve member 24, and a compression spring 38 inserted in a cylindrical receptacle 29 in valve member 24. Spring 38 is held in position by a narrow cylindrical portion 41 of a threaded plug 40 disposed in a mating threaded bore in housing 17. The housing 17 of thermostat 16, also includes as a part of the valve element 23, a hot fluid passage or bore 32 therethrough, which intersects valve member bore 31 and has a flared inlet opening 34 and threaded outlet opening 36.

A fitting 42 is threaded into outlet opening 36 and a hose 44 is provided communicating between fitting 42 and a fitting 46 disposed in the inlet opening 4 of the hot water chamber 2. A hot water inlet pipe 48 communicates with inlet 34 and has a T portion 49 communicating through hose 52 with a T portion 51 of a water outlet pipe 50. Water outlet pipe 50 also communicates with the water outlet 6 of the hot water chamber 2.

A check valve 54 communicates with the inlet 10 of the gasoline chamber 8. A short metal pipe section communicates with the outlet 12 of gasoline chamber 8, and a hose 58 extends therefrom to a pressure regulator 60.

Most of the gasoline preheater described, is preferably made of aluminium other than, of course, the hoses, fittings, the components of the valve element 23, heat sensing element 19, and check valve 54 and pressure regulator 60. Check valve 54 and pressure regulator 60 of course are of well known construction. Pressure regulator 60 is preferably set at about 1 to 5 p.s.i., while the thermo-stat is constructed to maintain gasoline temperature in the gasoline chamber 8 at about 110° to 120° F.

The gasoline preheater as described is used in combination with a gasoline engine which has a hot water cooling system, a carburetor (not a fuel injection system), and a source of pressurized fuel which is typically supplied by a fuel pump. A hose 56 is connected between check valve 54 and the outlet of the fuel pump (not shown) while a hose 62 is provided which communicates between the pressure regulator 60 and the fuel inlet of the carburetor (not shown). The hot water inlet pipe 48 is connected to the hot water heater hose found on most vehicles and which is removed from the inlet of the hot water heater block. The water outlet pipe 50 is then connected by a hose and suitable fittings (not shown) through to the inlet position on the hot water heater block from which the hot water heater hose was removed. Typically, the pressure regulator is set to operate between 1 to 1.5 p.s.i. for a six cylinder engine and between about 2 to 3 p.s.i. for an eight cylinder engine, the exact setting depending upon altitude (a lower setting being used at lower altitudes). After the device is installed, the carburetor is adjusted after the engine has warmed up and preferably a complete tune-up is also provided. For best results, a 160° F. engine block thermostat is installed during the summer months, and a 185° F. engine block thermostat is installed during the winter months, in the hot water cooling system of the vehicle engine.

In operation, any gasoline in gasoline chamber 8 will be heated by hot water in hot water chamber 2. As gasoline is demanded by the engine carburetor, it will flow out of gasoline chamber 8 and through pressure regulator 60, and hence through hose 62 at a regulated pressure. When the pressure is higher in hose 56 than in gasoline chamber 8, gasoline can flow from the fuel pump, through hose 56 and check valve 54 into the gasoline chamber 8. Heat sensing element 19, and specifically sensor portion 20 thereof, responds to increased temperature of gasoline in gasoline chamber 8 by causing the expansion portion 22 to move to the left in FIG. 3, against the pressure of spring 38. Thus, cylindrical portion 26 of valve member 24 will begin to block the hot water flow which would otherwise occur. Such hot water flow is from hot water inlet pipe 48 to bore 32, fitting 42, hose 44 and fitting 46, into hot water chamber 2 and then through outlet 6 therein and pipe 50, and then to the hot water heater of the vehicle. When portion 26 partially or completely blocks passage 32, hot water can continue to flow between the hot water inlet pipe 48 and outlet pipe 50 through water by-pass pipe 52. As the temperature of gasoline in gasoline chamber 8 begins to lower, heat sensor portion 20 of heat sensing element 19 will allow the expansion 22 to move back to the right in FIG. 3 under tension of spring 38, such that cylindrical portion 30 of valve member 24 is again disposed at least completely or partially within bore 32 to allow hot water to flow completely or partially therethrough and hence into hot water chamber 2. In actual operation, valve body 24 will maintain the passage 32 partially open under steady running conditions of the engine. The components of the thermostat 16 are so constructed such that the gasoline temperature in the gasoline chamber 8 will be maintained at about 110° to 120° F. in steady, warmed-up operation of a typical engine.

It should be noted here that water by-pass pipe 52 increases the response rate at which water will again flow through hot water chamber 2 upon an opening of valve element 23 of thermostat 16 from the closed position. That is, in the absence of a by-pass pipe 52 and with the conventional cooling system (including centrifugal pump) of a typical gasoline engine, water does not again flow through hot water chamber 2 when valve element 23 moves to an open position from a closed position, as fast as it does with the water by-pass pipe 52 being present. It will also be noted that the purpose of plug 14 is to act as an access port to facilitate servicing of the gasoline preheater as described. Upon drainage of water and gasoline from the device, plug 14 can be unscrewed and a special elongated tool inserted lengthwise through gasoline chamber 8 to unscrew heat sensing element 19 which is aligned with plug 14 from its mating threaded bore in housing 17 of thermostat 16, and remove it back to the threaded opening for plug 14. In addition, by removing threaded plug 40 (which acts as an access port of the thermostat housing), the spring 38 and the valve body 24 can also be removed for replacement or servicing as desired. Thus, the components of the gasoline preheater as described are readily accessed for servicing or replacement by the removal only of two threaded plugs 14 and 40. The remainder of the components, namely hoses and fittings are of course readily externally accessible, while the housings 3, 9, and 17 would not be expected to require any type of servicing.

The check valve 54 serves the purpose that heated gasoline in gasoline chamber 8 cannot expand back down through hose 56. Thus, there is no uncontrolled heating of hose 56 by any heated gasoline, nor of the fuel pump to which hose 56 would be connected. Pressure regulator 60 serves the function of maintaining a rate of flow of heated gasoline into the carburetor which would be approximately equivalent to that of unheated gasoline if the gasoline preheater was not present. Thus, overflow of the carburetor float chamber does not occur as readily as would be the case in the absence of the regulator 60. In addition, carburetor float valve wear is reduced due to the pressure being lower than would otherwise be the case in the absence of pressure regulator 60.

The device as described above was forwarded to various individuals for testing on their vehicles. The results reported by the owners of those vehicles are given in the Table I below. The percentage increase in mileage in each case is averaged, and will, of course, depend on the particular vehicle and the driver's driving habits over the time of the test.

TABLE I

| Vehicle Type | Engine Size (cubic inch displacement) | Percentage Increase in Mileage from Original Miles Per Gallon |
| --- | --- | --- |
| 1978 Thunderbird | 351 | 27% from 16 m.p.g. |
| 1981 Ford Truck | 429 | 32% |
| 1976 Dodge Van | 318 | 25% from 20 m.p.g. |
| 1978 Chrysler | 360 | 38% from 13 m.p.g. |
| 1978 Chevrolet Truck (4 by 4) | 305 | 33% from 15 m.p.g. |

The following Table II illustrates various examples on vehicles which were tested with and without the above device, by the inventor himself. Again the percentage increase in mileage was averaged, and depends upon vehicle and driving habits.

TABLE II

| Vehicle Type | Engine Size (cubic inch displacement) | Percentage Increase in Mileage from Original Miles per Gallon |
| --- | --- | --- |
| 1972 Motorhome Class A, Dodge Motor | 440 | 20% from 8 m.p.g. at 60 m.p.h. 42% from 8 m.p.g. at 50 m.p.h. |
| 1980 Chevrolet ½ Ton Truck | 305 | 30% from 18 m.p.g. |
| Dodge Class A Motorhome, Dodge motor | 440 | 50% from 8 m.p.g. |
| 1980 Chevrolet ½ Ton Truck | 402 | 64% from 12 m.p.g. |

Various modifications and alterations to the device as disclosed will of course be evident to one skilled in the art in view of the foregoing disclosure. Accordingly, the invention is to be interpreted in light of the scope and substance of the following claims.

I claim:

1. A gasoline preheater, comprising
   (a) a hot fluid chamber having an inlet and outlet;
   (b) a gasoline chamber in heat exchanging contact with said hot fluid chamber, and having an inlet, an outlet, and an access port therein;
   (c) a thermostat having:
      (i) a housing with a valve member bore extending therethrough, and a hot fluid passage extending therethrough which intersects the valve member bore and communicates with said hot fluid chamber;
      (ii) a valve member disposed within the valve member bore and slidable therein between a fully closed position blocking the hot fluid passage, and a fully open position not substantially blocking the hot fluid passage;
      (iii) a heat sensing element releasably mounted on the housing so as to be removable therefrom through the access port in the gasoline chamber, and communicating with said gasoline chamber and said valve member so as to reversibly move the valve member toward the fully closed position and allow decreased hot fluid flow through the hot fluid bore and into the hot fluid chamber, in response to an increase in gasoline temperature in said gasoline chamber.

2. A gasoline preheater as described in claim 1 wherein the valve element of said thermostat is in communication with the inlet of said hot fluid chamber so as to control hot fluid flow into said hot fluid chamber, said hot fluid chamber is in the form of a jacket disposed around the sides of said gasoline chamber, the access port in said gasoline chamber and the heat sensing element are aligned and disposed at opposite ends of said gasoline chamber.

3. A gasoline preheater as described in claim 1 wherein the thermostat housing has an access port adjacent an end of the valve member bore remote from said gasoline chamber, such that the valve member can be removed from the valve member bore therethrough.

4. A gasoline preheater as described in claim 2 wherein the thermostat housing has an access port adjacent an end of the valve member bore remote from said gasoline chamber, such that the valve member can be removed from the valve member bore therethrough.

5. A gasoline preheater as described in claim 1 wherein the heat sensing element comprises an expansion portion inserted in a receptacle in the valve member, the thermostat additionally comprising resilient means for urging the valve member toward the fully open position.

6. A gasoline preheater as described in claim 3 wherein the thermostat housing has an access port adjacent an end of the valve member bore remote from said gasoline chamber, such that the valve member can be removed from the valve member bore therethrough.

7. A gasoline preheater as described in claim 6, additionally comprising a pressure regulator communicating with the outlet of said gasoline chamber.

8. A gasoline preheater as described in claim 6 wherein said hot fluid chamber is in the form of a jacket disposed around the sides of said gasoline chamber.

9. A gasoline preheater as described in claim 7 wherein said hot fluid chamber is in the form of a jacket disposed around the sides of said gasoline chamber.

10. A gasoline preheater as described in claim 1 wherein said hot fluid chamber is a hot water chamber, the gasoline preheater additionally comprising a water by-pass pipe communicating between the inlet and outlet of said hot water chamber so as to enable water to pass therebetween when the valve element of said thermostat is closed.

11. A gasoline preheater as described in claim 8 wherein said hot fluid chamber is a hot water chamber, the gasoline preheater additionally comprising a water bypass pipe communicating between the inlet and outlet of said hot water chamber so as to enable water to pass therebetween when the valve element of said thermostat is closed.

12. A gasoline preheater as described in claim 9 wherein said hot fluid chamber is a hot water chamber, the gasoline preheater additionally comprising a water bypass pipe communicating between the inlet and outlet of said hot water chamber so as to enable water to pass therebetween when the valve element of said thermostat is closed.

13. A gasoline preheater as described in claim 6 wherein said pressure regulator is set at about 1 to 5 p.s.i., and said thermostat is constructed to maintain gasoline temperature in said gasoline chamber at about 110° to 120° F.

14. A gasoline engine and gasoline preheater combination, comprising:
(a) a gasoline engine having a hot fluid system, a carburetor, and a source of pressurized fuel;
(b) a gasoline preheater having:
(i) a hot fluid chamber having an inlet and outlet, at least one of which communicates with the hot fluid system so as to allow hot fluid to pass from the hot fluid system and through the hot fluid chamber;
(ii) a gasoline chamber in heat exchanging contact with the hot fluid chamber, and having an inlet communicating with the source of pressurized fuel, an outlet communicating with the carburetor, and an access port therein;
(iii) a thermostat having:
(1) a housing with a valve member bore extending therethrough, and a hot fluid passage extending therethrough which intersects the valve member bore and communicates with said hot fluid chamber;
(2) a valve member disposed within the valve member bore and slidable therein between a fully closed position blocking the hot fluid passage, and a fully open position not substantially blocking the hot fluid passage;
(3) a heat sensing element releasably mounted on the housing so as to be removable therefrom through the access port in the gasoline chamber, and communicating with said gasoline chamber and said valve member so as to reversibly move the valve member toward the fully closed position and allow decreased hot fluid flow through the hot fluid bore and into the hot fluid chamber, in response to an increase in gasoline temerature in said gasoline chamber.

15. A gasoline engine and gasoline preheater combination as described in claim 14, the valve element of said thermostat is in communication with the inlet of said hot fluid chamber so as to control hot fluid flow into said hot fluid chamber, said hot fluid chamber is in the form of a jacket disposed around the sides of said gasoline chamber, the access port in said gasoline chamber and the heat sensing element are aligned and disposed at opposite ends of said gasoline chamber, wherein the thermostat housing has an access port adjacent an end of the valve member bore remote from said gasoline chamber, such that the valve member can be removed from the valve member bore therethrough, and wherein the heat sensing element comprises an expansion portion inserted in a receptacle in the valve member, the thermostat additionally comprising resilient means for urging the valve member toward the fully open position.

16. A gasoline engine and gasoline preheater combination as described in claim 15, wherein said gasoline preheater additionally has a check valve communicating between the inlet of the gasoline chamber and the source of pressurized fuel, so as to prevent gasoline flow out of the inlet of the gasoline chamber, and additionally has a pressure regulator communicating between the outlet of the gasoline chamber and the carburetor.

17. A gasoline engine and gasoline preheater combination as described in claim 14, wherein the hot fluid system of the engine is a hot water cooling system and the hot fluid chamber is a hot water chamber, and wherein the inlet and outlet of the hot water chamber communicate with the hot water cooling system so as to allow hot water to pass from the hot water cooling system, through the hot water chamber, and back to the hot water cooling system.

18. A gasoline engine and gasoline preheater combination as described in claim 15, wherein the hot fluid system of the engine is a hot water cooling system and the hot fluid chamber is a hot water chamber, and wherein the inlet and outlet of the hot water chamber communicate with the hot water cooling system so as to allow hot water to pass from the hot water cooling system, through the hot water chamber, and back to the hot water cooling system.

19. A gasoline engine and gasoline preheater combination as described in claim 16, wherein the hot fluid system of the engine is a hot water cooling system and the hot fluid chamber is a hot water chamber, and wherein the inlet and outlet of the hot water chamber communicate with the hot water cooling system so as to allow hot water to pass from the hot water cooling system, through the hot water chamber, and back to the hot water cooling system.

20. A gasoline engine and gasoline preheater combination as described in claim 15 wherein the hot water chamber is in the form of a jacket disposed around the sides of said gasoline chamber.

21. A gasoline engine and gasoline preheater combination as described in claim 19 wherein the hot water chamber is in the form of a jacket disposed around the sides of said gasoline chamber.

22. A gasoline engine and gasoline preheater combination as described in claim 17, wherein said gasoline preheater additionally comprises a water bypass pipe communicating between the inlet and outlet of the hot water chamber so as to enable water to pass therebetween when the valve element of the thermostat is closed.

23. A gasoline engine and gasoline preheater combination as described in claim 21, wherein said gasoline preheater additionally comprises a water bypass pipe communicating between the inlet and outlet of the hot water chamber so as to enable water to pass therebetween when the valve element of the thermostat is closed.

24. A gasoline engine and gasoline preheater combination as described in claim 23 wherein the check valve opens at a pressure differential of about 7 p.s.i., the pressure regulator is set at about 1 to 5 p.s.i., and the thermostat is constructed to maintain gasoline temperature in the gasoline chamber at about 110° F. to 120° F.

* * * * *